United States Patent [19]

Wolfgang

[11] 4,418,554

[45] Dec. 6, 1983

[54] KEY OPERATED LOCKING MECHANISM

[75] Inventor: Günter Wolfgang, Wuppertal, Fed. Rep. of Germany

[73] Assignee: Neiman S.A., Courbeovie, France

[21] Appl. No.: 302,005

[22] Filed: Sep. 15, 1981

[30] Foreign Application Priority Data

Sep. 18, 1980 [DE] Fed. Rep. of Germany ....... 3035172

[51] Int. Cl.³ .............................................. E05B 29/02
[52] U.S. Cl. ......................................... 70/360; 70/361
[58] Field of Search ................ 70/360, 357, 373, 361,
70/419, 421, 364 R

[56] References Cited

U.S. PATENT DOCUMENTS

| 2,098,189 | 11/1937 | Kistner | 70/373 |
| 4,009,599 | 3/1977 | Petriquin | 70/360 |
| 4,077,240 | 3/1978 | Crasnianski | 70/360 |

Primary Examiner—Robert L. Wolfe

Attorney, Agent, or Firm—Dowell & Dowell

[57] ABSTRACT

A key operated locking mechanism comprises a cylinder housing, an axially displaceable cylinder core which rotates in a cylindrical opening in the cylinder housing and which is movable axially between a locking position and an unlocking position, a locking bolt movable by said core between locking and unlocking positions, and plate tumblers on said core which project, in the axially displaced locking position of the cylinder core, beyond the external surface thereof when the key has been withdrawn. In the cylindrical opening in the cylinder housing there is provided at least one contact surface, which is arranged so as to be transverse of the lock axis and is directed towards the locking bolt, for cooperation with a portion of at least one of said plate tumblers that surmounts the cylinder core surface at a point with which the surmounting portion is in abutting contact in that axial position of the cylinder core in which the locking bolt is in its locking position.

7 Claims, 2 Drawing Figures

KEY OPERATED LOCKING MECHANISM

BACKGROUND TO THE INVENTION

The invention relates to a locking cylinder intended for a lock, more especially a steering lock, and comprising an axially displaceable cylinder core which rotates in a cylindrical opening in the cylinder housing and to which a locking bolt is secured in a coaxial or axially parallel manner and whose small-plate tumblers project, in the axially displaced locking position of the cylinder core, from the external surface thereof when the key has been withdrawn.

STATEMENT OF PRIOR ART

A locking cylinder of this kind is known from DE GM 1 689 481. The cylinder core of this known locking cylinder is held in the inserted locking position by a radial pin which is provided on the outside of the cylinder core and which lies in a recess in the cylinder housing. Apart from this pin, there are not provided any further means which hold the cylinder core in the locking position.

OBJECT OF THE INVENTION

It is the object of the invention to provide a lock of the kind mentioned at the beginning which has a protection against an axial withdrawal of the cylinder core from the locking position which is simple in construction and from the point of view of the installation and which is rugged.

SUMMARY OF THE INVENTION

According to the invention there is provided a key operated locking mechanism comprising, a cylinder housing, an axially displaceable cylinder core which rotates in a cylindrical opening in the cylinder housing and which is movable axially between a locking position and an unlocking position, a locking bolt movable by said core between locking and unlocking positions, and plate tumblers on said core which project, in the axially displaced locking position of the cylinder core, beyond the external surface thereof when the key has been withdrawn, wherein in the cylindrical opening in the cylinder housing there is provided at least one contact surface, which is arranged so as to be transverse of the lock axis and is directed towards the locking bolt, for co-operation with a portion of at least one of said plate tumblers that surmounts the cylinder core surface at a point with which the surmounting portion is in abutting contact in that axial position of the cylinder core in which the locking bolt is in its locking position, said contact surface closing a tumbler recess means formed longitudinally in said cylinder housing, into which recess means the plate tumblers project in the locking position when the key has been removed, at the key introduction end, said recess means being open in the direction of the locking bolt.

Due to this contact surface, there is provided on the cylinder core, in addition or alternatively to a radial locking pin, a support for the cylinder core in the inserted locking position so that a high degree of security is brought about along with a very simple construction. If a radial locking pin is already provided on the cylinder core, then the locking function thereof is not replaced by the small tumbler plate which comes into abutting contact behind the contact surface, but a further protection against axial withdrawal is provided by the small-plate tumbler. One or several small-plate tumblers thus provide in addition to their function to lock against rotation, the function to lock against an axial withdrawal in the locking position of the cylinder core. If desired only the small tumbler plate which is nearest to the key introduction end may have an axial locking function. The cylinder housing can be produced in a particularly simple manner, more especially by means of injection moulding, if the tumbler recess means, which is shut towards the key introduction end, is opened in the direction of the locking bolt.

Since only the tumbler channel has to have one or several locking contact surfaces for the small tumbler plates, the other axially parallel channels in the cylindrical opening which are required for the small-plate tumblers can be opened in the direction of the key introduction end.

A particularly high resistance against withdrawal is brought about if more than one small tumbler plate, particularly if all tumbler plates come into abutting contact behind contact surfaces in the locking position of the cylinder core. For this purpose, it is proposed that the tumbler recess means into which the small-plate tumblers project in the locking position while the key has been removed should be subdivided into sections by more than one contact surface. The subdivisions may be recesses which form the contact surfaces. These recesses can be particularly easily introduced into the cylinder housing from the outside. This may be effected by milling or else, during the injection-moulding process, by radially run-in parts.

Preferably, it is proposed that for each small-plate tumbler there should be provided a slot-shaped recess. Also, in the locking position, the recesses in the cylinder housing may be aligned with the cylinder core slots provided for the small-plate tumblers and may have approximately the dimensions thereof in cross section.

Two exemplified embodiments of the invention are shown in the drawings and will be described in more detail hereinafter.

DESCRIPTION OF PREFERRED EMBODIMENT

Figure 1:
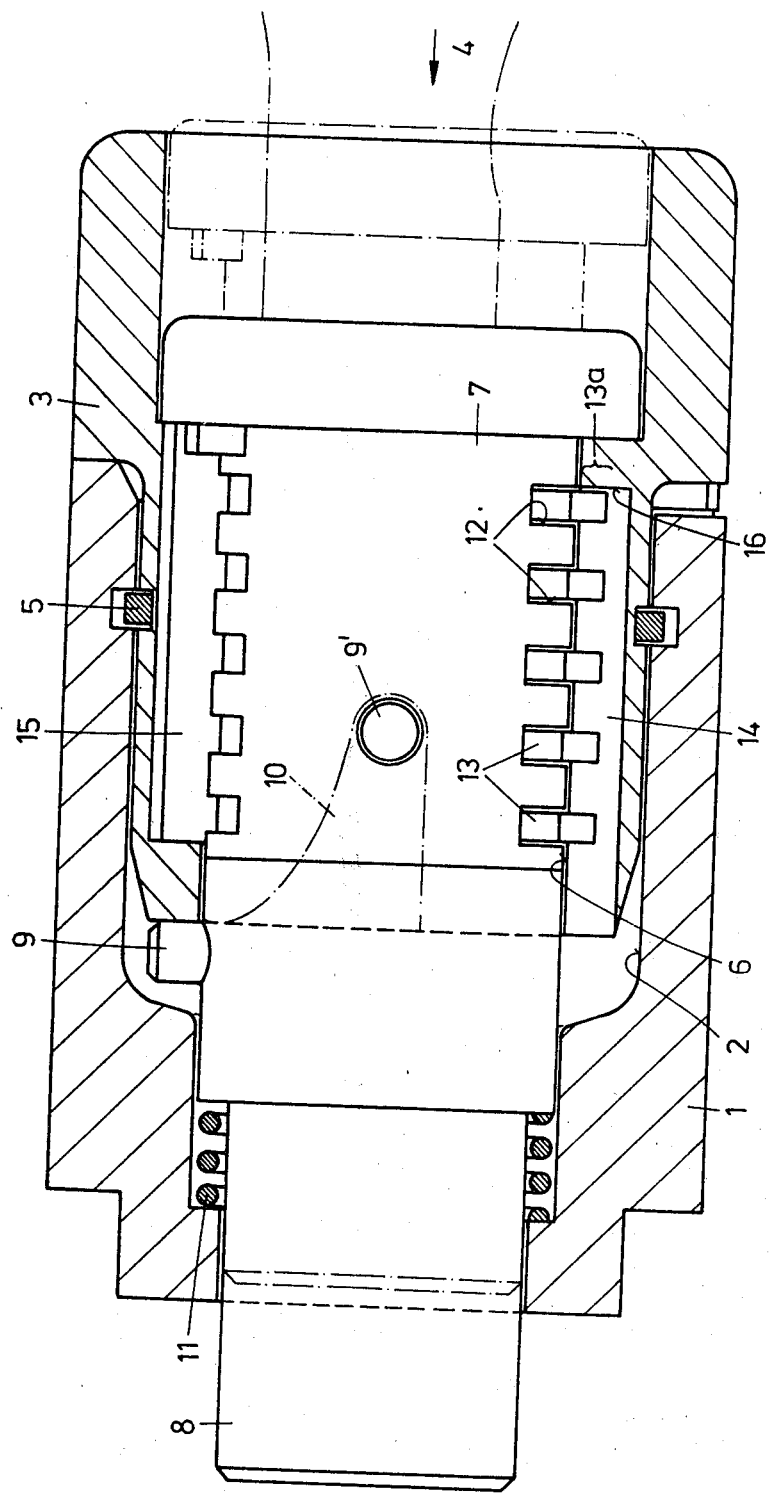
FIG. 1 shows an axial section through a cylinder lock in a first exemplified embodiment, with a continuous tumbler channel which is shut only in the direction of the key introduction end.

The lock may be used for locking the steering column of a two-wheeler and comprises a cylindrical reception housing 1, into whose coaxial internal stepped bore 2 a cylinder housing 3 has been inserted from the key introduction end 4 and is undetachably fastened by a locking ring 5. In the coaxial cylindrical opening 6 in the cylinder housing there is axially displaceably located a cylinder core 7, to whose end that is opposite to the key introduction end there is coaxially secured a locking bolt 8, whose free end, in the locking position of the cylinder core 7 shown in FIG. 2, projects from the reception housing 1 and lies in a recess in a steering column not shown or in a socket of a steering column.

A pin 9, which is radially secured to the cylinder core 7, lies in a slot 10 in the cylinder housing 3 in the non-locking position of the cylinder core and passes during the axial displacement and rotation of the cylinder core in the locking position behind the ring-shaped front end of the cylinder housing 3 so as in this way to retain the cylinder core 7 in the locking position against the pressure exerted by a spring 11.

In the cylinder core 7, there are located in diagonal slots 12 small-plate tumblers 13 which, approximately concentric with the key channel, have identical openings, through which the key penetrates. In the direction of an axially parallel tumbler channel 14, which is provided in the cylinder housing 3, each small tumbler plate 13 is acted on by springs (not shown) which push a portion 13a of the small-plate tumblers into the tumbler channel 14 when the key has been removed. By this means, the cylinder core 7 is locked against rotation about its longitudinal axis when the key has been withdrawn. At the side that is diametrically opposite to the tumbler channel 14, there is provided in the cylinder housing 3 a second axially parallel channel 15, into which the small tumbler plates can recede for a short time while the key is being introduced and the tumblers slide along the notches in the narrow side of the key. The small plates also project into the tumbler channel 15 when a wrong key is introduced. Over and above this, two further diametrically opposite axially parallel channels (not shown) are provided in the cylinder housing at an angle of rotation to the tumbler channel 14 and to the second channel 15, so as to render possible movements of the small-plate tumblers when the key is inserted or withdrawn in the non-locking position of the cylinder core.

While the second channel 15 and the two channels not shown are shut in the direction of the locking bolt 8 and are opened in the direction of the key introduction end 4, the tumbler channel 14 is opened in the direction of the locking bolt and is shut in the direction of the key introduction end. The shut end of the tumbler channel 14 forms a contact surface 16 which is arranged so as to be transverse of the lock axis and is, in particular, radial and with which the broad side, which is directed towards the key introduction end 4, of that small-plate tumbler 13 that is nearest to the key introduction end comes into abutting contact. In the locking position of the cylinder core 7, the cylinder core is thus prevented from being axially withdrawn not only by the pin 9 but also by this small-plate tumbler.

Figure 2:
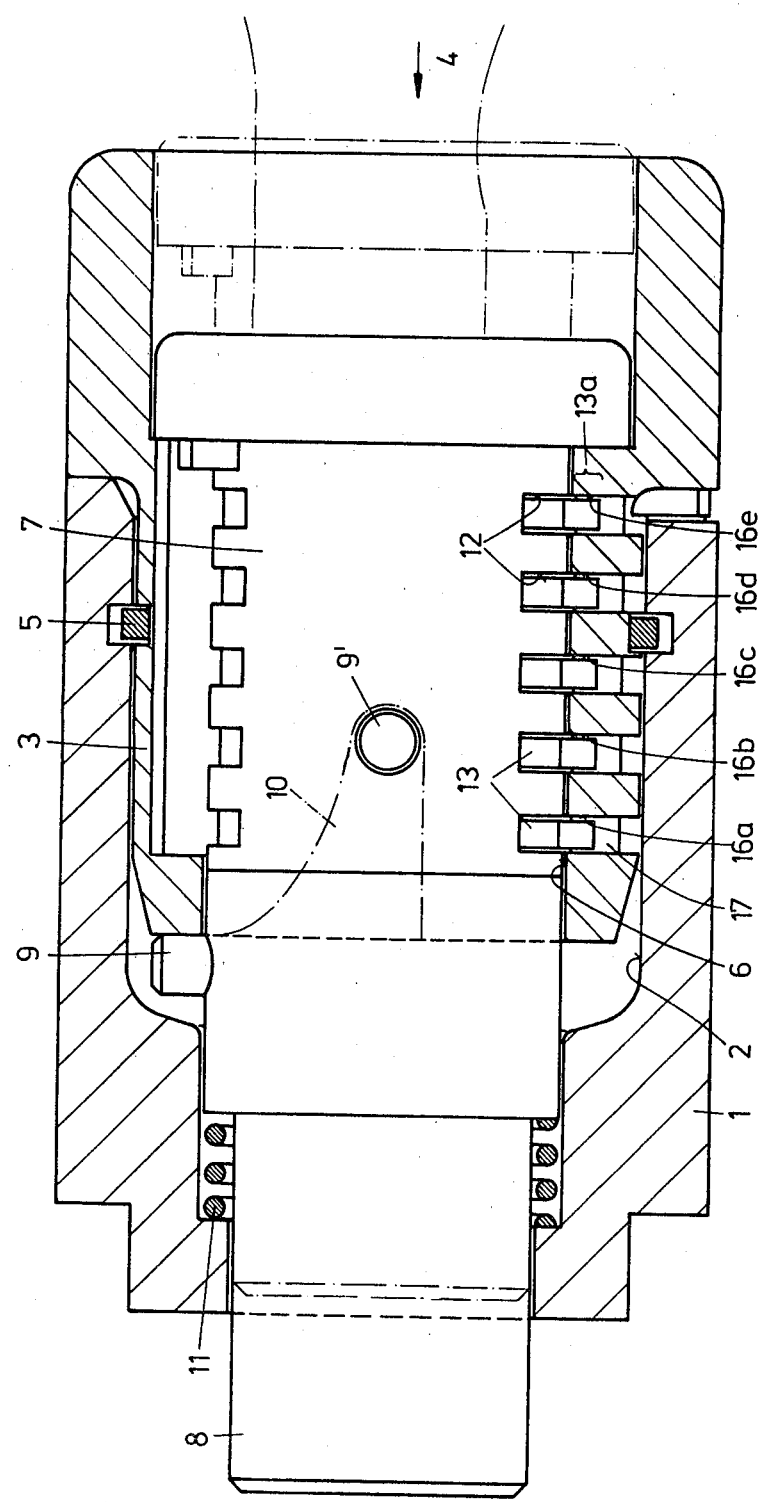
FIG. 2 shows a locking cylinder, as shown in FIG. 1, with individual recesses in the cylinder housing instead of the tumbler channel.

Instead of the tumbler channel 14, there may be provided in the cylinder housing, as shown in FIG. 2, radial recesses 17 (slots, channels, pockets) which have the same cross section as the slots 12 in the cylinder core and are aligned with these in the locking position. The side faces or broad sides, which are directed towards the locking bolt 8, of the parallel recesses 17 consequently form contact surfaces 16a, 16b, 16c, 16d, 16e, with which the small-plate tumbler parts 13a projecting from the cylinder core 7 come into abutting contact. By this means, when the key has been withdrawn, all small-plate tumblers 13 form, in addition to the pin 9, detents preventing a movement of the cylinder core 7 from the locking position into the unlocked position.

In both exemplified embodiments, the pin 9 can be dispensed with since only one or several small-plate tumblers ensure that the cylinder core and the locking bolt are secured in the locking position. In order to facilitate the withdrawal of the key, when the pin 9 is missing, it is expedient not to provide the spring 11 and to ensure that the cylinder core and/or the locking bolt offer sufficient resistance to the withdrawal of the key. This intentional axial difficulty of motion of the cylinder core and/or the locking bolt in the cylinder housing and/or in the reception housing can be brought about by conventional means, such as a sufficiently high friction, a viscous grease or a simple limit-force locking mechanism.

The second tumbler channel 15 may be constructed in exactly the same way as the tumbler channel 14 and may consequently also have one or several contact surfaces 16 and recesses 17. The recesses 17 in the channel 15 may open out into the cylindrical outside of the cylinder housing 3.

I claim:

1. A key operated locking mechanism comprising:
 (a) a cylinder housing;
 (b) an axially displaceable cylinder core which rotates in a cylindrical opening in the cylinder housing and which is movable axially between a locking position and an unlocking position,
 (c) a locking bolt movable by said core between locking and unlocking positions, and
 (d) plate tumblers on said core which project, in the axially displaced locking position of the cylinder core, beyond the external surface thereof when the key has been withdrawn, wherein in the cylindrical opening in the cylinder housing there is provided at least one contact surface, which is arranged so as to be transverse of the lock axis and is directed towards the locking bolt, for co-operation with a portion of at least one of said plate tumblers that surmounts the cylinder core surface at a point with which the surmounting portion is in abutting contact in the axial position of the cylinder core in which the locking bolt is in its locking position, said contact surface closing a tumbler recess means formed longitudinally in said cylinder housing, into which the recess means plate tumblers project in the locking position when the key has been removed, at the key introduction end, said recess means being open in the direction of the locking bolt.

2. A locking mechanism according to claim 1, wherein other tumbler recess means are provided longitudinally in the cylindrical opening, which receive the plate tumblers, and are open at the key introduction end.

3. A locking mechanism acocrding to claim 1, wherein the tumbler recess means into which the plate tumblers project in the locking position when the key has been removed, is subdivided into sections by more than one contact surface.

4. A locking mechanism according to claim 3, wherein the subdivided sections are in the form of recesses which form the contact surfaces.

5. A locking mechanism according to claim 4, wherein the recesses are slot-shaped, each receiving a plate tumbler.

6. A locking mechanism according to claim 4, wherein in the locking position the recesses in the cylinder housing are aligned with slots in the cylinder core, which are provided for the plate tumblers, and have approximately the dimensions thereof in cross section.

7. A locking mechanism according to claim 4, wherein the recesses pass through the wall of the cylinder housing.

* * * * *